United States Patent
Fan et al.

(10) Patent No.: US 6,380,278 B1
(45) Date of Patent: Apr. 30, 2002

(54) POLYURETHANE SALTS

(75) Inventors: Mingxin Fan, West Chester; Xiaoxing Chuck Dong, Lancaster; Jeffrey Allan Klang; James Horgan, both of West Chester; Gary W. Ceska, Exton, all of PA (US)

(73) Assignee: Sartomer Technology Co., Inc., Wilmington, DE (US)

( * ) Notice: Subject to any disclaimer, the term of this patent is extended or adjusted under 35 U.S.C. 154(b) by 0 days.

(21) Appl. No.: 09/932,560

(22) Filed: Jan. 19, 2001

(51) Int. Cl.$^7$ .............................................. C08G 18/30
(52) U.S. Cl. .................. 522/93; 526/240; 526/241; 560/25; 560/58; 556/1; 556/44; 556/50; 556/56; 556/63; 556/77; 556/107; 556/116; 556/134; 556/136; 556/148; 556/183; 556/442
(58) Field of Search ............................ 522/93; 526/240, 526/241; 556/1, 44, 50, 56, 63, 77, 107, 116, 134, 136, 148, 183, 442; 560/25, 58

(56) References Cited

PUBLICATIONS

Saija, Leo M.; Uminski, Macie; Unsaturated Alcohols & Gycols Containing Ionizable Groups for Synthesis of Urethane Acrylate Graft Copolymer Latices; Angew. Makromol. Chem.; 233, pp. 103–112; Nov. 1995.*

* cited by examiner

*Primary Examiner*—Rachel Gorr
(74) *Attorney, Agent, or Firm*—Michael B. Fein; Cozen O'Connor

(57) ABSTRACT

A urethane (meth)acrylate metal salt obtained by reacting (A) one or more polyisocyanates, (B) one or more hydroxy functional (meth)acrylates, and (C) one or more metal salt polyols which are the reaction product of a metal oxide and a half ester containing a hydroxy group and a carboxylic acid group. Processes of preparing such salts and polymers prepared from such salts are also disclosed. The polymers are useful for coating and adhesive compositions prepared by radiation or peroxide curing processes.

14 Claims, No Drawings

POLYURETHANE SALTS

BACKGROUND OF THE INVENTION

This invention relates to metal containing polyurethane salts.

Metal-containing polyurethanes and polyurethane-ureas have been reported in the prior art.

All the metal-containing polyurethanes and polyurethane-ureas suggested in the prior art have hydroxyl- or amino-terminal functional groups and have poor solubility. Most of the prior polymers are prepared in very polar solvent such as DMSO, and DMF.

Urethane (meth)acrylates have been widely used as a class of oligomers or resins in radiation curable based and peroxide based systems, and are known to provide the toughness as crosslinkers. Metal (meth)acrylates such as zinc, calcium, and magnesium salts of (meth)acrylic acids are known as crosslinking monomers for use with elastomers to promote adhesion to substrates. Zinc diacrylate, and zinc methacrylate have been suggested as crosslinking agents for elastomers such as EPDM, 1,4-butadiene, isoprene, chloprene, and the like. Unsaturated carboxylic metal salts such as zinc and calcium diacrylates are known to be useful as crosslinkers in curable elastomeric compositions wherein the elasto may be a nitrile rubber, EPDM, EVA, and the like.

Soluble zinc and calcium salts of ethylene glycol-methacrylate-phthalate prepared in aqueous solution and then copolymerized with methyl methacrylates (MMA), styrene (ST), and hydroxyethyl methacrylate (HEMA) have been reported as having improved physical properties.

Electrically conductive resins prepared from metal salts of certain sulphonates, phosphates or phosphoric acid diesters, with an epoxide, optional solvent, polymerization initiator, and/or photosensitizer have been reported to be useful for magnetic tape.

Polyvalent metal salts of compounds such as diethylene glycol methacrylate phthalate, mixed with an organic peroxide have been reported to be soluble in styrene MMA, and EA. Copolymerization with such vinyl monomers to produce polymers having high heat distortion temperature, tensile strength, compressive strength, impact strength and Rockwell hardness, as well as resistance to chemical attack, has been reported.

Magnesium, aluminum, and calcium salts of unsaturated phosphate compounds have been reported as additives for coatings to improve adhesion to metals. Peroxide cured adhesives prepared by copolymerizing such salt monomers with hydroxy propyl methacrylate (HPM) have been reported as well.

There has been no suggestion in the prior art of metal-containing urethanes with terminal (meth)acrylate groups nor any suggestions as to preparation of soluble metal containing polyurethane salts which do not require polar solvent for preparation with regard to solubility and avoiding the need of polar solvent in the preparation.

SUMMARY OF THE INVENTION

It is therefore an object of the present invention to provide metal containing urethanes which do not require polar solvent for preparation. It is also an object to prepare soluble metal containing polyurethane salts.

It is a further object to provide metal containing urethane (meth)acrylate adhesives, coatings, inks, transparent molded articles useful as lenses, and thermoset laminating resins with thermoplastic properties.

These objects and others which will become apparent from the following disclosure are achieved by the present invention which comprises in one aspect a urethane (meth)acrylate metal salt obtained by reacting (A) one or more polyisocyanates; (B) one or more hydroxy functional (meth)acrylates; and (C) one or more metal salt polyols which are the reaction product of a metal oxide and a half ester containing a hydroxy group and a carboxylic acid group.

In another aspect the invention comprises a process for preparing the urethane (meth)acrylate salt comprising reacting (A) one or more polyisocyanates; (B) one or more hydroxy functional (meth)acrylates; and (C) one or more metal salt polyols which are the reaction product of a metal oxide and a half ester containing a hydroxy group and a carboxylic acid group.

DETAILED DESCRIPTION OF THE INVENTION AND THE PREFERRED EMBODIMENTS

This new invention relates to a new class of materials containing urethane linkage as well as ionic linkage in the backbones, which can be crosslinked free radically via terminal (meth)acrylate functional groups. The term "(meth)acrylate" is used herein as an abbreviation to mean both acrylates and methacrylates.

The new resins of this invention are thermoset systems, having both urethane linkages and ionic bonds, providing toughness for the final polymers. However, the metallic urethane acrylates of the invention are different from the traditional thermoset polymers since they contain ionic crosslinkings which are based on coulombic forces and therefore are heat/temperature dependent. The final polymers will provide dynamic properties when heated or where heat buildup is a factor. Positive attributes of the novel metallic acrylate urethanes include good adhesion to substrates, good thermal properties (Tg, HDT), high strength, and reversible ionic crosslinking. The positive attributes of metallic urethane acrylates include toughness, flexibility, chemical resistance and abrasion resistance.

Some uses of the metal urethane acrylates are UV powder coatings, rubber to metal adhesion, composites, golfballs, modifiers for unsaturated polyesters, UV/EB cure, peroxide cure, conductive coatings, adhesives, radiation shading coatings, radiopaque materials, corrosion inhibitors, static discharge agents, heat buildup release modifiers, flow modifiers, dynamic property modifiers, and thermosetting materials with thermoplastic properties.

Suitable metals include lithium, sodium, potassium, cesium, magnesium, calcium, strontium, barium, titanium, zirconium, vanadium, chromium, molybdenum, tungsten, manganese, iron, cobalt, nickel, palladium, copper, zinc, cadmium, mercury, boron, aluminum, gallium, indium, silicon, germanium, tin, lead, antimony, bismuth, and the like. The metal compound can be, for example, the oxide, halide, alkoxide, hydroxide, nitrate, sulfate, carboxylate, and carbonate. The most preferred metal compound is zinc oxide since it reacts very easily and is readily available.

Suitable anhydrides and dicarboxylic acids include phthalic acid, trimellitic anhydride (which contains one anhydride and one carboxyl group), pyromellitic anhydride, 5-norbornene-endo-2,3-dicarboxylic anhydride, naphthyl anhydride, naphthalene tetracarboxylic acid dianhydride, maleic anhydride, succinic anhydride, chlorendic anhydride, maleic acid, succinic acid, fumaric acid, oxalic acid, malonic acid, glutaric acid, adipic acid, dimer fatty acids, and styrene/maleic anhydride polymers.

Suitable polyols include diols such as ethylene glycol, propylene glycol, 1,3-propanediol, 1,2, 1,3 or 1,4 butanediols, 2-methyl-1,3-propane diol (MPDiol), neopentyl glycol (NPG), alkoxylated derivatives of such diols, polyether diols, polyester diols, and the like.

Suitable higher functional polyols are trimethylol propane (TMP), PETA, di-TMP, di-PETA, glycerol, alkoxylated derivatives thereof, and the like.

Some examples of suitable hydroxyl-containing (meth)acrylates are hydroxyethyl (meth)acrylate, hydroxypropyl (meth)acrylate, hydroxybutyl (meth)acrylate, trimethylolpropane mono- and di-(meth)acrylate, pentaerythritol mono-, di-, tri- (meth)acrylate, dipentaerythritol mono-, di-, tri-, tetra-, and penta-(meth)acrylate, neopentyl glycol (meth)acrylate, hexanediol mono(meth)acrylate, tris(2-hydroxyethyl)isocyanurate mono- and di(meth)acrylate, polypropylene glycol mono(meth)acrylate, polyethylene glycol mono (meth)acrylate, polypropylene/polyethylene glycol mono(meth)acrylate, polybutyl glycol mono(meth)acrylate, polytetramethylene glycol mono(meth)acrylate, hydroxy polycaprolacton mono(meth)acrylate, and ethoxylated and propoxylated derivatives thereof.

Some of the polyisocyanate examples are hexamethylene diisocyanate, isophorone diisocyanate, cyclohexane-1,4-diisocyanate, methylene bis(4-cyclohexylisocyanate), toluene diisocyanate, diphenylmethane 4,4-diisocyanate, xylene diisocyanate, 1,4-phenylene diisocyanate, diisocyanates and triisocyanates of HDI-based oligomers, and other aliphatic and aromatic isocyanates.

The metal-containing urethane (meth)acrylates of the invention can be prepared with or without catalysts. In the case where catalyst is required, many catalysts can be used. Catalyzed reactions are desirable due to the shortened reaction time and fewer by-products. Typical catalysts which may be used for this reaction are amines and metal-based catalysts. Some examples are dibutyltin dilaurate, 1,4-diazabicyclo[2.2.2]-octane (DABCO), 1,8-diazabicyclo-[5.4.0]-undec-7-ene (DBU), N,N-dimethylcylohexylamine (DMCA), tetramethyltin, tetrabutyltin, tetraoctyltin, tributyltin chloride, dibutyltin dichloride, dimethyltin oxide, trimethyltin chloride, dimethyltin dichloride, trioctyltin chloride, dibutyltin oxide, dibutyltin diacetate, butyltin trichloride, dioctyltin dichloride, dioctyltin oxide, dioctyltin dilaurate, and dioctyltin diacetate. Zinc, iron, bismuth, and zirconium complexes similar to- those tin-based complexes set forth above would also be useful as catalysts for the condensation reaction of this invention.

The salts are obtained by reacting (A) one or more polyisocyanates, (B) one or more hydroxy functional (meth)acrylates, and (C) one or more metal salt polyols which are the reaction product of a metal oxide and a half ester containing a hydroxy group and a carboxylic acid group. The metal salt polyol(s) can be the reaction product of metal compound with a half ester of a carboxylic anhydride or a diarboxylic acid and adiol. The metal salt polyol(s) can be mixed and reacted with a molar excess of the polyisocyanate (s) followed by reacting the resultant isocyanato-terminated product with the hydroxy functional (meth)acrylate(s), or in an alternative method the polyisocyanate(s), hydroxy functional (meth)acrylate(s), and metal salt polyol(s) can be mixed and reacted in one step.

In the condensation reaction, it is desirable to use between 0.5 and 2.0, preferably 0.75 and 1.5, more preferably between 0.9 and 1.1 equivalents of isocyanate for each equivalent of hydroxyl. In this manner, it is assured that there are few free alcohols or free isocyanates remaining in the final materials.

The final, condensed product will contain (meth)acrylate functionalities and can be reacted or crosslinked with free radical mechanism such as peroxides or radiation curing processes. The following examples illustrate a few embodiments.

EXAMPLES

Example 1
Preparation of MPDiol-HHMPA Half-Ester

A 1-liter round bottom flask fitted with a mechanical stirrer, heating mantle with temperature controller, thermocouple and air sparge was charged with HHMPA (400 g), MPDiol (236 g), triphenylphosphine (1.27 g) and sodium acetate (0.32 g) and the mixture heated to 100° C. for 1 hour. The product half-ster was obtained in 96% yield as a viscous liquid with AV of 210 mg KOH/gm, and viscosity of 2987 cPs @ 60° C.

Example 2
Preparation of (MPDiol-HHMPA)$_2$Zn

A 1 liter round bottom flask equipped as above plus a Dean-Stark trap was charged with MPDiol-HHMPA half-ester (200 g), ZnO (30 g), toluene (200 g), and methanesulfonic acid (2.5 g) and the mixture was heated to reflux. Heating was continued until water generation stopped and the initially milky reaction mixture turned clear. After filtration and removal of the solvent the product was obtained in 84% yield as a viscous liquid (viscosity of 2600 cPS at 100° C.).

Example 3
Preparation of TPG-Phthalate Half-Ester

A 1 liter round bottom flask equipped as in Example 1 was charged with tripropylene glycol (253 g) phthalic anhydride (175 g), triphenylphosphine (1.8 g) and sodium acetate (0.6 g) and the mixture was heated to 100° C. for 1 hour. The product half-ester was obtained in 95% yield as a viscous liquid with AV of 154 mg KOH/gm, and viscosity of 35,730 cPs @ 25° C.

Example 4
Preparation of (TPG-Phthalate)$_2$Zn

A 1 liter round bottom flask equipped as in Example 2 was charged with TPG-phthalate half-ester (195 g), ZnO (21 g), toluene (300 g), and methanesulfonic acid (1.9 g) and the mixture was heated to reflux. Heating was continued until water generation stopped and the initially milky reaction mixture turned clear. After filtration and removal of the solvent the product was obtained in 97% yield as a viscous liquid (viscosity of 1900 cPS at 100° C.).

Example 5
Preparation of BDO-HHMPA Half-Ester

A 1 liter round bottom flask equipped as in Example 1 was charged with 1,4-butanediol (236 g), HHMPA (400 g), triphenylphosphine (1.3 g) and sodium acetate (0.3 g) and the mixture was heated to 100° C. for 1 hour. The product half-ster was obtained in 92% yield as a crystalline semi-solid with AV of 226 mg KOH/gm.

Example 6
Preparation of (BDO-HHMPA)$_2$Zn Metal Salt Polyol

A 1 liter round bottom flask equipped as in Example 2 was charged with BDO-HHMPA half-ester (384 g), ZnO (60 g), toluene (300 g), and methanesulfonic acid (5.7 g) and the mixture was heated to reflux. Heating was continued until water generation stopped and the initially milky reaction mixture turned clear. After filtration and removal of the solvent the product was obtained in 97% yield as a viscous liquid (viscosity of 2025 cPS at 100° C.).

Example 7
Preparation of Urethane Acrylate

Metal-containing polyol from Example 6 was used to prepare a zinc salt urethane diacrylate oligomer based on isophorone diisocyanate and hydroxyethyl acrylate. Isophorone diisocyanate (IPDI, 135.41 g) was added to the polyol which was diluted with 25% ethoxylated trimethyolpropane triacrylate (polyol, 2000.0 g; SR454, 100.0 g) over 2 hours at 60° C., followed by addition of hydroxyethyl acrylate (70.8 g). The reaction mixture was kept at 90° C. for 4 hour. A viscous liquid resin was obtained. The final product is light yellow and hazy liquid. The viscosity @ 60° C. is only 920 cps.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A urethane (meth)acrylate metal salt obtained by reacting
    (A) one or more polyisocyanates
    (B) one or more hydroxy functional (meth)acrylates, and
    (C) one or more metal salt polyols which are the reaction product of a metal oxide and a half ester containing a hydroxy group and a carboxylic acid group.

2. Salt of claim 1 wherein the half ester is the reaction product of a carboxylic anydride and a diol.

3. Salt of claim 1 wherein the metal is selected from the group consisting of lithium, sodium, potassium, cesium, magnesium, calcium, strontium, barium, titanium, zirconium, vanadium, chromium, molybdenum, tungsten, manganese, iron, cobalt, nickel, palladium, copper, zinc, cadmium, mercury, boron, aluminum, gallium, indium, silicon, germanium, tin, lead, antimony, bismuth.

4. Salt of claim 1 wherein the polyiscocyanate is selected from the group consisting of hexamethylene diisocyanate, isophorone diisocyanate, cyclohexane-1,4-diisocyanate, methylene bis(4-cyclohexylisocyanate), toluene diisocyanate, diphenylmethane 4,4-diisocyanate, xylene diisocyanate, 1,4-phenylene diisocyanate, diisocyanates and triisocyanates of HDI-based oligomers.

5. Salt of claim 1 wherein the half ester is the reaction product of a carboxylic anhydride and a diol selected from the group consisting of ethylene glycol, propylene glycol, 1,3-propanediol, 1,2, 1,3 or 1,4 butanediols, 2-methyl-1,3-propane diol (MPDiol), NPG, alkoxylated derivatives of these, polyether diols, polyester diols.

6. Salt of claim 1 wherein the half ester is the reaction product of a diol and a carboxylic anhydride selected from the group consisting of phthalic acid, trimellitic anhydride (which contains one anhydride and one carboxyl group), pyromellitic anhydride, 5-norbornene-endo-2,3-dicarboxylic anhydride, naphthyl anhydride, naphthalene tetracarboxylic acid dianhydride, maleic anhydride, succinic anhydride, chlorendic anhydride, maleic acid, succinic acid, fumaric acid, oxalic acid, malonic acid, glutaric acid, adipic acid, dimer fatty acids, and styrene/maleic anhydride polymers.

7. Salt of claim 1 wherein the hydroxy functional (meth)acrylates are selected from the group consisting of hydroxyethyl (meth)acrylate, hydroxypropyl (meth)acrylate, hydroxybutyl (meth)acrylate, trimethylolpropane mono- and di-(meth)acrylate, pentaerythritol mono-, di-, tri-(meth)acrylate, dipentaerythritol mono-, di-, tri-, tetra-, and penta-(meth)acrylate, neopentyl glycol (meth)acrylate, hexanediol mono(meth)acrylate, tris(2-hydroxyethyl)isocyanurate mono- and di(meth)acrylate, polypropylene glycol mono(meth)acrylate, polyethylene glycol mono(meth)acrylate, polypropylene/polyethylene glycol mono(meth)acrylate, polybutyl glycol mono(meth)acrylate, polytetramethylene glycol mono(meth)acrylate, hydroxy polycaprolacton mono (meth)acrylate, ethoxylated or propoxylated versions of all the above.

8. Salt of claim 1 wherein (A) and (C) are reacted so as to form an isocyanate functional polymer, followed by reaction of said isocyanate functional polymer with (B).

9. Salt of claim 1 wherein (A), (B) and (C) are mixed together and reacted.

10. Salt of claim 1 wherein (A) and (B) are reacted so as to form an isocyanate functional acrylic polymer, followed by reaction of said socyanate functional acrylic polymer with (C).

11. Salt of claim 1 wherein the molar ratio of (A) to (B) is 1.01 to 1.5.

12. Coating and adhesive compositions prepared by polymerizing the salts of claim 1.

13. Process of preparing a urethane (meth)acrylate salt comprising reacting
    (A) one or more polyisocyanates
    (B) one or more hydroxy functional (meth)acrylates, and
    (C) one or more metal salt polyols which are the reaction product of a metal oxide and a half ester containing a hydroxy group and a carboxylic acid group.

14. Process of claim 12 wherein a molar excess of (A) is reacted with (C), followed by reacting the resultant isocyanate terminated compound with (B) so as to form a (meth)acrylate functional urethane metal salt.

* * * * *